(12) United States Patent
Kherat et al.

(10) Patent No.: US 10,406,800 B2
(45) Date of Patent: Sep. 10, 2019

(54) MACHINE CONTROL SYSTEM FOR CONTOUR CRAFTING

(71) Applicant: CATERPILLAR INC., Peoria, IL (US)

(72) Inventors: Sam M. Kherat, Peoria, IL (US); Matthew T. West, East Peoria, IL (US); John A. Sherman, Peoria, IL (US)

(73) Assignee: Caterpillar Inc., Deerfield, IL (US)

(*) Notice: Subject to any disclaimer, the term of this patent is extended or adjusted under 35 U.S.C. 154(b) by 859 days.

(21) Appl. No.: 14/931,123

(22) Filed: Nov. 3, 2015

(65) Prior Publication Data

US 2017/0121959 A1    May 4, 2017

(51) Int. Cl.

| | |
|---|---|
| *B33Y 30/00* | (2015.01) |
| *G01B 11/27* | (2006.01) |
| *B33Y 10/00* | (2015.01) |
| *B33Y 50/02* | (2015.01) |
| *B28B 1/00* | (2006.01) |
| *B28B 3/20* | (2006.01) |
| *B28B 17/00* | (2006.01) |
| *G01B 11/25* | (2006.01) |

(52) U.S. Cl.
CPC .............. *B33Y 30/00* (2014.12); *B28B 1/001* (2013.01); *B28B 3/20* (2013.01); *B28B 17/0081* (2013.01); *B33Y 10/00* (2014.12); *B33Y 50/02* (2014.12); *G01B 11/25* (2013.01); *G01B 11/272* (2013.01)

(58) Field of Classification Search
CPC ........ E04B 1/166; G01B 11/272; B33Y 10/00
See application file for complete search history.

(56) References Cited

U.S. PATENT DOCUMENTS

| | | | |
|---|---|---|---|
| 4,805,086 A | 2/1989 | Nielsen et al. | |
| 5,296,915 A | 3/1994 | Akesaka | |
| RE34,576 E | 4/1994 | Camilleri et al. | |
| 5,528,498 A | 6/1996 | Scholl | |
| 6,098,322 A | 8/2000 | Tozawa et al. | |
| 6,731,991 B1 | 5/2004 | Michalski et al. | |
| 6,738,216 B2 | 5/2004 | Savard et al. | |
| 6,897,967 B2 | 5/2005 | Nilsson | |
| 7,042,172 B2* | 5/2006 | Dowling ............ | G01N 21/8806 250/227.29 |
| 8,644,964 B2 | 2/2014 | Hendron et al. | |

(Continued)

*Primary Examiner* — Vincent H Tran
(74) *Attorney, Agent, or Firm* — Finnegan, Henderson, Farabow, Garrett & Dunner, LLP

(57) ABSTRACT

Systems and methods are disclosed for contour crafting. The system includes a work tool configured to form a first layer by depositing material from a print head and following a path for depositing a second layer of material atop the first layer. The system further includes an optics assembly configured to produce a light pattern directed toward previously deposited material, and a camera configured to capture image data of the previously deposited material. The system further includes a processing device being configured to obtain, from the image data, a visible formation of the light pattern as it is projected onto the previously deposited material, and make a comparison of the visible formation to a predicted formation. The processing device is further configured to determine that the second layer is not aligned with the first layer, and adjust of the path being followed by the work tool based on the determination.

20 Claims, 4 Drawing Sheets

(56) References Cited

U.S. PATENT DOCUMENTS

| | | | |
|---|---|---|---|
| 2008/0312866 A1* | 12/2008 | Shimomura | G01B 11/25 |
| | | | 702/155 |
| 2009/0316965 A1* | 12/2009 | Mailling | A43D 1/025 |
| | | | 382/128 |
| 2010/0183194 A1* | 7/2010 | Umemura | G01B 11/03 |
| | | | 382/103 |
| 2014/0256067 A1* | 9/2014 | Cheng | G03F 7/70633 |
| | | | 438/14 |
| 2015/0059957 A1* | 3/2015 | Sood | H01L 24/75 |
| | | | 156/64 |
| 2015/0273583 A1* | 10/2015 | Bumgardner | B22F 3/1055 |
| | | | 419/53 |
| 2015/0328839 A1* | 11/2015 | Willis | G05B 19/4099 |
| | | | 700/98 |
| 2015/0331402 A1* | 11/2015 | Lin | G06F 17/5009 |
| | | | 700/119 |
| 2016/0156899 A1* | 6/2016 | Higo | G01B 11/2545 |
| | | | 348/48 |
| 2016/0236414 A1* | 8/2016 | Reese | G05B 19/4099 |
| 2016/0236416 A1* | 8/2016 | Bheda | B29O 64/386 |

\* cited by examiner

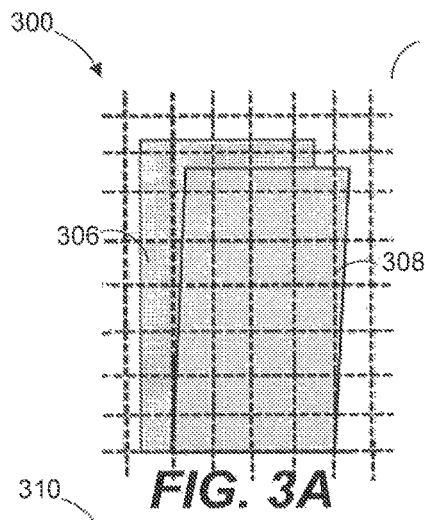 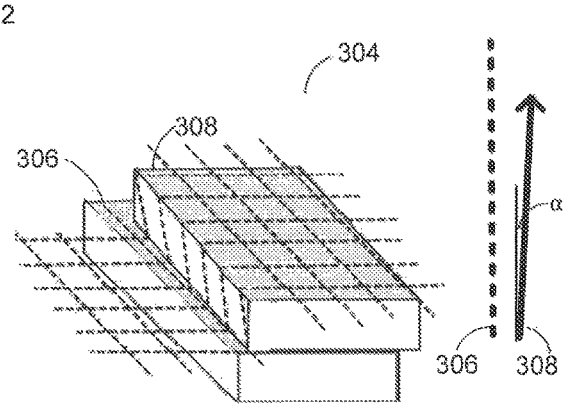
FIG. 3A  FIG. 3B  FIG. 3C
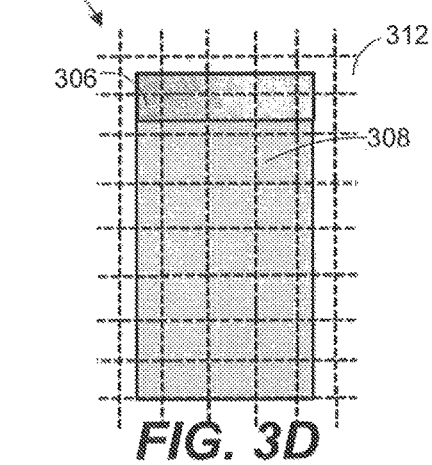 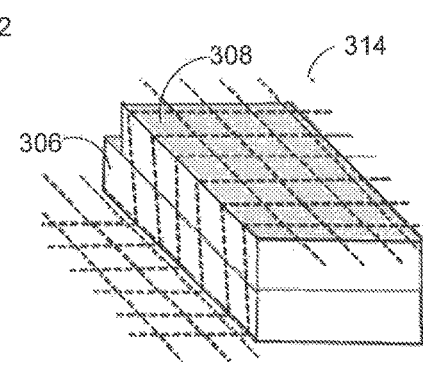 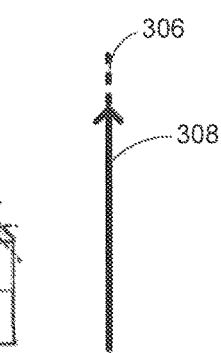
FIG. 3D  FIG. 3E  FIG. 3F
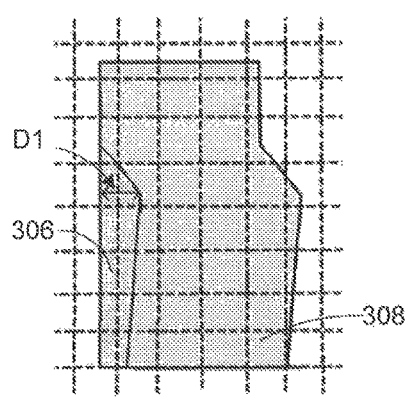 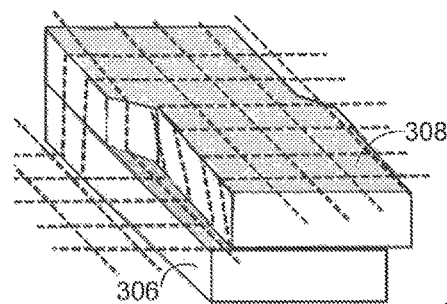 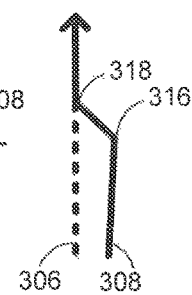
FIG. 3G  FIG. 3H  FIG. 3I

MACHINE CONTROL SYSTEM FOR CONTOUR CRAFTING

TECHNICAL FIELD

This disclosure relates generally to a control system, and, more particularly, to a machine control system for contour crafting.

BACKGROUND

Contour crafting is a manufacturing process used to fabricate large-scale, three-dimensional structures in a layer-by-layer manner by extruding a flowable material similar to concrete. The flowable material is extruded through an extrusion tip carried by a print head, and deposited in a sequence of paths on a substrate in a plane. The extruded material fuses with previously deposited material, and solidifies upon a decrease in temperature. The position of the print head relative to the substrate is then incremented along a height, perpendicular to the plane, and the process is then repeated to form the three-dimensional structure. The movement of the print head with respect to the substrate is performed under computer control, in accordance with pre-programed depositing paths. The depositing paths are obtained by initially slicing a digital representation of the three-dimensional structure into multiple horizontally sliced two-dimensional layers. Then, for each sliced two-dimensional layer, a path for depositing the flowable material is determined.

One way for implementing contour crafting is using a stationary machine, such as a modified gantry crane. The modified gantry crane is stable, but cumbersome to set up. The crane also imposes limitations on the size of three-dimensional structure that can be manufactured. Another way for implementing contour crafting is using a mobile machine, such as excavator. The excavator may hold a printing tool while it deposits the layers of flowable material. One challenge of using mobile machines for contour crafting is maintaining a high level of accuracy and repeatability of the print head. If the print head deposits layers offset from one another, the stability and strength of the printed structure may be impaired.

U.S. Pat. No. 8,644,964 (the '964 patent) to Hendron et al. discloses a device and a method for controlling movement of a reference point on an end effector coupled to an excavator. The '964 patent indicates that vibration and other factors can alter the location of the reference point when the excavator moves the reference point in a defined path. Accordingly, the '964 patent suggests a device having two closed loop control systems. The first closed loop control system is adapted to determine an actual location of the reference point, and to detect a difference between the actual location and a desired location. The second closed-loop control system is configured to move the reference point from the actual location to the desired location.

Although aiming to provide a controlled movement of a print head coupled to an excavator, the system of the '964 patent is still limited. In particular, the system of the '964 patent does not take into consideration the placement of previously deposited material when adjusting the location of the reference point. Thus, when the location of the print head is at the desired location, there may still be a small deviation with respect to the placement of the previously deposited material. Since these large-scale, three-dimensional structures are achieved using an additive processes, any small deviation may have a cumulative significant effect.

The disclosed system is directed to solving one or more of the problems set forth above and/or other problems of the prior art.

SUMMARY

In one aspect, the present disclosure is directed to a control system for contour crafting. The control system may include a work tool configured to form a three-dimensional structure in an additive-layers process. The additive-layers process may include forming a first layer by depositing flowable material from a print head and following a path for depositing a second layer of flowable material atop the first layer. The system may further include an optics assembly mounted to the work tool and configured to produce a light pattern directed toward previously deposited material. The system may also include a camera configured to capture image data of the previously deposited material. The system may further include a processing device in communication with the optics assembly and the camera. The processing device may be configured to obtain, from the image data, a visible formation of the light pattern as it is projected onto the previously deposited material, and make a comparison of the visible formation of the light pattern to a predicted formation. The processing device may further be configured to make a determination that the second layer is not aligned with the first layer, based on the comparison, and make an adjustment of the path being followed by the work tool based on the determination.

In another aspect, the present disclosure is directed to a method for contour crafting. The method may include moving a work tool to form a three-dimensional structure in an additive-layers process. The additive-layers process includes forming a first layer by depositing flowable material from a print head and following a path for depositing a second layer of flowable material atop the first layer. The method may also include producing a light pattern directed toward previously deposited material, and capturing image data of the previously deposited material. The method may further include obtaining, from the image data, a visible formation of the light pattern as it is projected onto the previously deposited material, and making a comparison of the visible formation of the light pattern to a predicted formation of the light pattern. The method may further include determining that the second layer is not aligned with the first layer, based on the comparison, and adjusting the path being followed by the work tool.

In yet another aspect, the present disclosure is directed to a computer programmable medium having executable instructions stored thereon for completing a method for controlling an additive-layers process operated by a work tool. The additive-layers process includes forming a first layer by depositing flowable material from a print head and following a path for depositing a second layer of flowable material atop the first layer. The method may include obtaining, from the image data, a visible formation of the light pattern as it is projected onto the previously deposited material, and making a comparison of the visible formation of the light pattern to a predicted formation of the light pattern. The method may further include determining that the second layer is not aligned with the first layer, based on the comparison, and adjusting the path being followed by the work tool.

BRIEF DESCRIPTION OF THE DRAWINGS

FIGS. 3A-3I are diagrammatic representations of different formations of a light pattern on a structure constructed by the exemplary work tool of FIG. 1.

DETAILED DESCRIPTION

Figure 1:
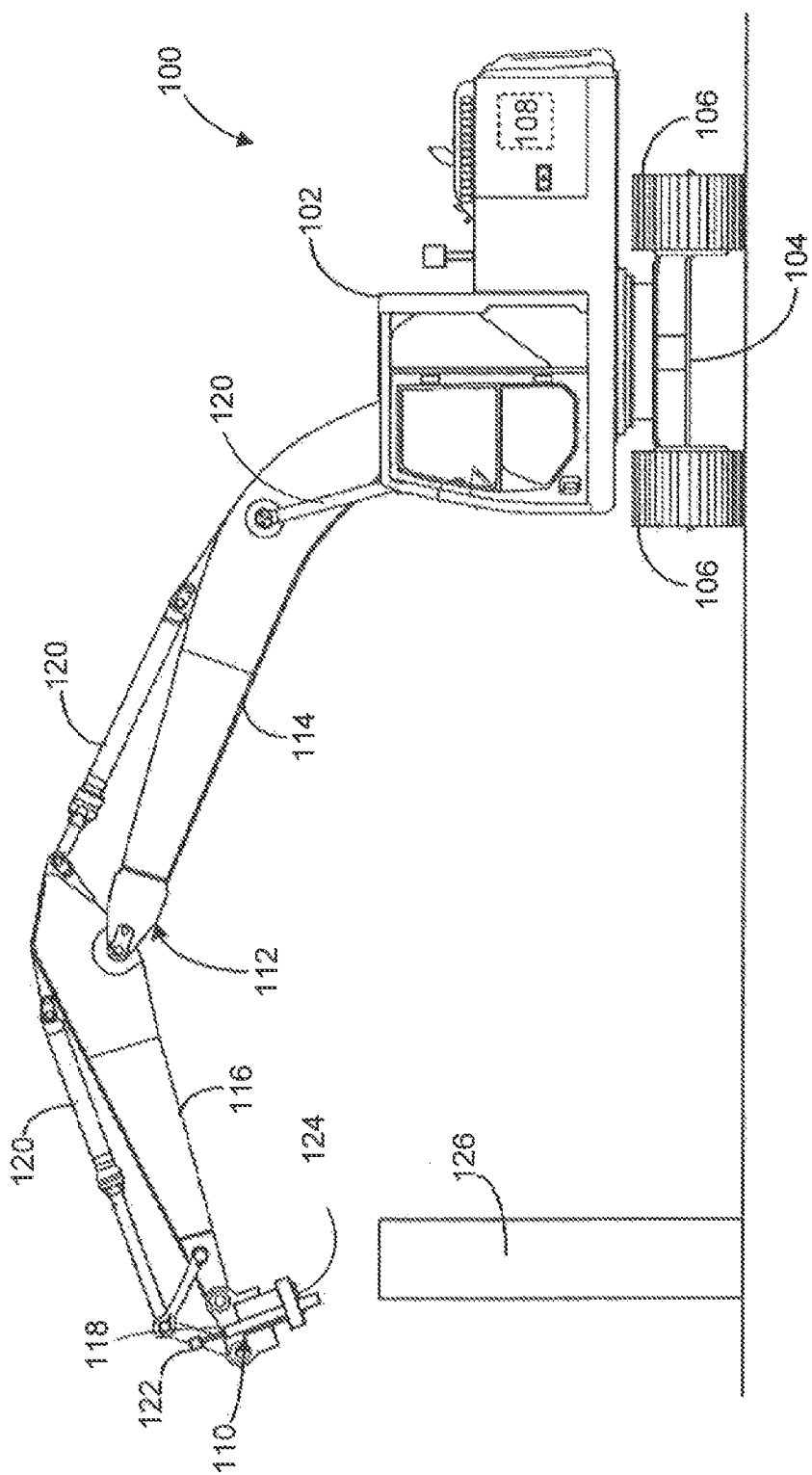
FIG. 1 is a diagrammatic side view illustration of an exemplary mobile machine and an exemplary work tool, according to embodiments of the present disclosure.

FIG. 1 illustrates a mobile machine 100 which may be used with the present disclosure. Although FIG. 1 illustrates an excavator, the present disclosure is applicable to other mobile machines besides an excavator and can include any machine where a work tool or other device may be attached to the machine with a pin joint. For example, the present disclosure may be similarly applied to backhoe loaders, wheel loaders, and other machines.

As depicted in FIG. 1, mobile machine 100 may include a body 102 disposed on top of and supported by an undercarriage 104. Undercarriage 104 may be associated with one or more ground engaging devices 106, which may be used for mobility and propulsion of mobile machine 100. Ground engaging devices 106 are shown as a pair of continuous tracks; however, ground engaging devices 106 are not limited to being continuous tracks and may include other ground engaging devices such as rotatable wheels.

Mobile machine 100 may include a power system 108 providing power to move ground engaging devices 106 and may include one or more power sources, such as internal combustion engines, electric motors, fuel cells, batteries, ultra-capacitors, electric generators, and/or any power source which would be known by a person having ordinary skill in the art. Power system 108 may further be used to power various functions of a work tool 110 or any other elements and subsystems associated with the mobile machine 100 and/or work tool 110.

For positioning and control of work tool 110, mobile machine 100 may further include a linkage arrangement 112, which may include a boom 114 operatively coupled with a stick 116. Work tool 110 may be attached to linkage arrangement 112 at, for example, a distal end 118 of the stick 116. Work tool 110 may be positioned and/or otherwise moved using a plurality of actuators. The term "actuator" refers to a component that is configured to selectively apply force against another component. The plurality of actuators may include, but are not limited to, hydraulic actuators, motors, or any other suitable device. The plurality of actuators may receive instructions to actuate a part of mobile machine 100, a part of work tool 110, or any other component associated work tool 110. In some embodiments, the plurality of actuators may be coupled to a pressurized oil system of mobile machine 100, and may be used to raise, lower, push, pull, rotate/pivot, or otherwise adjust the position of work tool 110.

The plurality of actuators may include a group of first actuators 120 associated with mobile machine 100 (e.g., boom, stick, and tool actuators) and a group of second actuators 122. The group of second actuators 122 are capable of moving work tool 110 independent of linkage arrangement 112. In one example, the group of second actuators 122 may include more than four prismatic actuators, such as, hydraulic cylinders. One example of the group of second actuators 122 that may be used consistent with the present disclosure is a Stewart platform. In a Stewart platform, the movement of work tool 110 may occur from a combination of synchronized motions of six hydraulic cylinders.

In some embodiments, work tool 110 may be an additive construction device (e.g., an extruder) that includes a print head 124 configured to deposit flowable material for constructing a structure 126 by laying down successive layers of the flowable material. The term "structure" includes any part or whole of a building. An additive manufacturing process, also often referred to as contour crafting or three-dimensional printing, is a process of creating three-dimensional structures from a digital plan or design file. The digital plans and/or design files can be transformed into cross-sectional two-dimensional layers that are used to determine a manufacturing plan.

Consistent with the present disclosure, the construction of structure 126 may be executed according to a related manufacturing plan. The manufacturing plan may include instructions with defined depositing paths for successive layers of material to be laid until construction of structure 126 is completed. The defined depositing paths may be generated based on a digital, three-dimensional model. When extruding flowable material along a defined depositing path, the speed, position, and trajectory of work tool 110 can be controlled.

Figure 2:
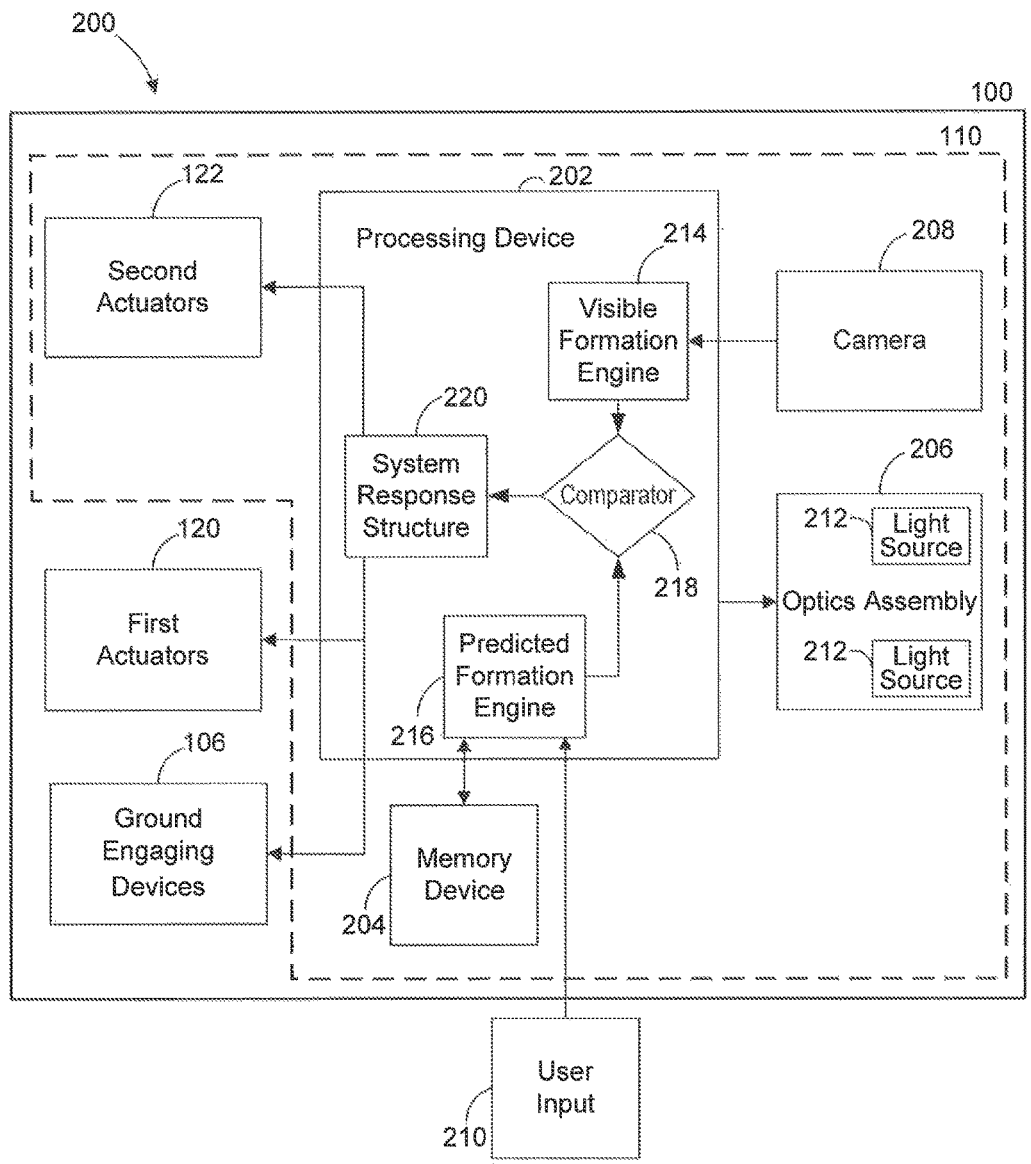
FIG. 2 is a schematic block diagram illustrating a system for controlling the exemplary work tool of FIG. 1.

In contour crafting, a precise control of work tool 110 is desired to properly and accurately lay the successive layers to construct the planned structure. The position and movement of work tool 110 may be controlled by a control system 200, which is schematically depicted in FIG. 2. In order to achieve the precise control of work tool 110, control system 200 may include a processing device 202, a memory device 204, an optics assembly 206, and a camera 208.

The control system 200 may be used to control work tool 110 in an autonomous mode, semi-autonomous mode, or manual mode. As used herein, the autonomous mode may include operating work tool 110 automatically based upon information received from various sensors without the need for human operator input. The semi-autonomous mode may involve an operator, either within mobile machine 100 or remotely, who performs some tasks or provides some input while other tasks are performed automatically based upon information received from various sensors. And the manual mode is one in which an operator is controlling all or essentially all of the direction, speed and manipulating functions of work tool 110.

Operation of work tool 110, in any of the above referenced modes, may be executed by processing device 202. The term "processing device" may include any physical device having an electrical circuit that performs a logic operation on inputs. For example, processing device 202 may include one or more integrated circuits, microchips, microcontrollers, processors, microprocessors, all or part of a central processing unit (CPU), graphics processing unit (GPU), digital signal processor (DSP), field programmable gate array (FPGA), or other circuits suitable for executing instructions or performing logic operations. Consistent with embodiments of the present disclosure, processing device 202 may be part of the operating system of work tool 110 and may operate the group of second actuators 122. Consistent with other embodiments of the present disclosure, processing device 202 may be part of the operating system of mobile machine 100 and may operate, ground engaging devices 106, the group of first actuators 120, and the group of second actuators 122.

In some embodiments, processing device 202 may be associated with a software product stored on memory device 204. Memory device 204 may be a non-transitory computer readable medium and comprise data and computer implementable instructions, which when executed by processing device 202, causes processing device 202 to perform operations. For example, the operations may include the depositing paths in which layers of flowable material are being deposited. Memory device 204 may include a memory, such as RAM, ROM, flash memory, a hard drive, etc. Memory device 204 may also be configured to store electronic data associated with the manufacturing plan, for example, details about work tool 110.

Processing device 202 may receive a user input 210 from the operator of mobile machine 100 to control the operation of work tool 110. In one embodiment, processing device 202 may receive user input 210 from an input device included in body 102. For example, the operator may provide commands for work tool 110 when mobile machine 100 is operating in either a manual or semi-autonomous manner. Additionally or alternatively, processing device 202 may receive user input 210 from a remote operator (e.g., from a command center, a foreman's station, and the like) over a wireless link. The wireless link may be used to convey commands to work tool 110 from a remote location. In certain embodiments, control of work tool 110 via control system 200 may be distributed, such that certain functions are performed by the operator of mobile machine 100 and other functions are performed from a remote command center.

In some embodiments, control system 200 includes optics assembly 206 that may be mounted to or otherwise associated with work tool 110. During the additive manufacturing process, optics assembly 206 may produce a light pattern directed toward previously deposited material. Optics assembly 206 may include one or more light sources 212 that generate the light pattern. The term "light source" includes any device capable of emitting a collimated beam of light. Suitable light sources include, but are not limited to, laser diodes. In one example, light source 212 may be capable of generating ultra-short pulse laser beams having pulses between $10^{-110}$ and $10^{-106}$ seconds in duration, a repetition rate of about 1-108 kH, a wavelength of about 300-1000 nm, and a pulse energy of about 0.1-3 mJ. As used in this specification, the term "light pattern" means a plurality of beams of coherent light that are produced by light source 212.

Optics assembly 206 may further include a delivery medium (not shown) that embodies a light-transmitting passageway. The delivery medium may be configured to direct the light beams from light source 212 toward optical equipment associated with optics assembly 206. It is contemplated that the delivery media may be a hollow core fiber having a core diameter of between about 10-150 μm and a durability sufficient to deliver high-energy laser pulses without significant deterioration or energy loss. Alternatively, the delivery media may embody a solid core fiber, for example, a glass optical fiber. In either configuration, it is contemplated that the delivery media may further include one or more co-axial layers or sheaths of lining material, with protective gas, for example, helium, argon, or nitrogen.

Optics assembly 206 may also include optical equipment (not shown) operably coupled with light source 212 to produce the light pattern. The term "optical equipment" may include any device that includes components capable of altering the direction of the light beams from light source 212. In some embodiments, optical equipment may be fixedly coupled to the tip end of delivery media and may include components that can be used to focus, redirect, and/or align one or more light beams by way of refraction. In some embodiments, optics assembly 206 may produce two-dimensional grids as the light pattern. For example: a square grid, a rectangular grid, a centered rectangular grid, an oblique grid, and a hexagonal grid. Additionally, optics assembly 206 may control various parameter of the grid, e.g., grid density, grid resolution, and grid edge roughness.

In some embodiments, control system 200 may further include at least one camera 208 mounted to or otherwise associated with any part of work tool 110 or mobile machine 100. The at least one camera 208 may be configured to capture image data of the previously deposited material. The term "camera" generally refers to a device configured to capture and record image data, for example, still images, video streams, time lapse sequences, etc. Camera 208 can be a monochrome digital camera, a high-resolution digital camera, or any suitable digital camera. Cameras 208 may capture image data of previously deposited material, and transfer the captured image data to processing device 202.

As shown in FIG. 2, processing device 202 may include a plurality of elements configured to perform one or more operations, consistent with the disclosed embodiments. Specifically, processing device 202 may include a visible formation engine 214, a predicted formation engine 216, a comparator 218, and a system response element 220. The elements may be coupled by one or more communication buses or signal lines. The disclosed embodiments are not limited to any particular configuration of processing device 202.

In some embodiments, visible formation engine 214 may receive captured image data from camera 208 and process the associated image data using one or more processing algorithms to produce a visible formation of the light pattern as it is projected on the previously deposited material. The term "formation of the light pattern" includes a representation of the light pattern with or without the previously deposited material. Predicted formation engine 216 may determine a predicted formation of the light pattern based on user input 210 and additional information stored in memory device 204. Examples of information that may be used to determine the predicted pattern include the manufacturing plan, dimensions of each printed layer, operational details of work tool 110, and more.

Comparator 218 may continuously compare the visible formation of the light pattern to the predicted formation of the light pattern in order to determine if a recently deposited layer is aligned with the previously deposited layer. In some embodiments, comparator 218 may determine that the recently deposited layer is not aligned with the previously deposited layer when a geometry of the visible formation differs from a geometry of the predicted formation. When comparator 218 determines that the recently deposited layer is not aligned with the previously deposited layer, system response element 220 may make an adjustment of the path being followed by work tool 110 based on the determination. The adjustment of the path may result from operation of ground engaging devices 106, operation of at least one of first actuators 120, operation of at least one of second actuators 122, or a combination thereof.

FIGS. 3A-3I include diagrammatic representations of different formations of the light pattern on structure 126. FIG. 3A illustrates an example of a visible formation 300 of the light pattern as it is projected onto the deposited material. Visible formation 300 may be obtained from the image data captured by camera 208. FIGS. 3A-3C show, from left to right, a top-view 302 of visible formation 300, a perspective view 304 of visible formation 300, and a trajectory representation of the actual depositing paths of a first layer 306 and second layer 308. FIGS. 3A-3C depict a case where the trajectory of the second layer 308 has a slight deviation to the right relative to first layer 306. The deviation is represented by a deviation angle α, and although deviation angle α may be very small the accumulated deviation effect increases as the deposition of second layer 308 goes on.

FIGS. 3D-3F illustrate an example of a predicted formation 310 of the light pattern as it is determined by processing device 202. In some embodiments, processing device 202 may determine the predicted formation based on tool-related information and job-related information. The tool-related information may include any detail associated with work tool 110, for example, the width of a layer (determined from the dimensions of print head 124), the distance between print head 124 and structure 126 when depositing the flowable material, and more. The job-related information may include any detail associated with structure 126, for example, the manufacturing plan, the type of flowable material being used, and more. FIGS. 3D-3F also show, from left to right, a top-view 312 of predicted formation 310, a perspective view 314 of predicted formation 310, and a trajectory representation of the predicted depositing paths of a first layer 306 and second layer 308. FIGS. 3D-3F depict how second layer 308 was supposed to be deposited relative to first layer 306.

FIGS. 3G-3I illustrate an example of an adjustment of the depositing path of second layer 308. In FIGS. 3G-3I, the trajectory of the second layer 308 deviates right relative to first layer 306 until a point 316. Point 316 represents the moment in time at which work tool 110 starts making an adjustment to the depositing path of second layer 308. After point 316, work tool 110 adjusts the depositing path to and changes the trajectory of second layer 308 until a point 318. Point 318 represents the moment in time at which first layer 306 substantially overlaps with second layer 308. From point 318, second layer 308 is being deposited in a path generally aligned with the path of first layer 306. The period of time between point 316 and point 318 is referred herein as an "adjustment period." The deviation distance between first layer 306 and second layer 308 at point 316 is represented by distance D1. The following discussion, with reference to FIG. 4, provides an exemplary process 400 for controlling work tool 110.

INDUSTRIAL APPLICABILITY

The present disclosure generally relates to control systems for work tools and, more specifically, to control systems for work tools connectable to mobile machines that are configured to form three-dimensional structures in an additive-layers process. As discussed above, control system 200 may be employed for control of work tool 110 using optics assembly 206 and camera 208. Optics assembly 206 may project a light pattern on the three-dimensional structure being constructed. Camera 208 may capture deviations in the deposition of material relative to previously deposited material. By utilizing optics assembly 206 and camera 208 in such control systems, the disclosed system may provide fine control and improved accuracy for work tool 110 of mobile machine 100 when forming structure 126.

Figure 4:
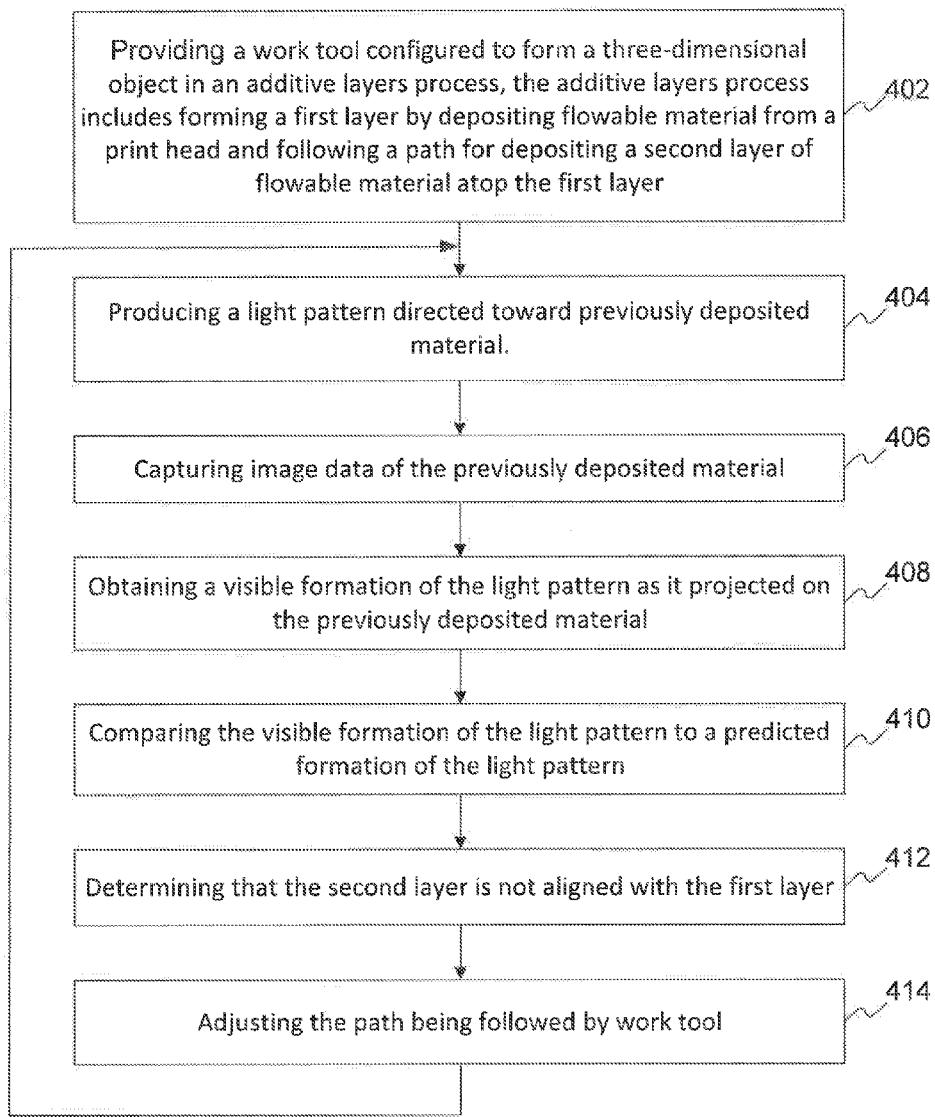
FIG. 4 is a flowchart showing an exemplary process for controlling the exemplary work tool of FIG. 1.

To that end, FIG. 4 illustrates a flowchart of process 400 for controlling work tool 110 by using optics assembly 206 and camera 208. Process 400 begins at step 402, when a work tool configured to form a three-dimensional structure in an additive-layers process, such as work tool 110, is provided. The additive-layers process includes forming first layer 306 by depositing flowable material from a print head 124 and following a path for depositing second layer 308 of flowable material atop first layer 306.

At step 404, optics assembly 206 may produce a light pattern directed toward previously deposited material. Optics assembly 206 may produce any of the following types of light patterns: a square grid, a rectangular grid, a centered rectangular grid, an oblique grid, a hexagonal grid, or any other pattern. In some embodiments, optics assembly 206 may include a plurality of light sources separated from each other that together produce the light pattern. In one example, the plurality of light sources may be separated in distance, and the distance between two light sources may be more than 1 mm, more than 10 mm, or more than 50 mm. In another example, the plurality of light sources may emit light beams in different wavelengths. In other embodiments, optics assembly 206 may produce more than one type of light pattern and be configured to switch between the different types of light patterns. For example, optics assembly 206 may periodically switch between producing a rectangular grid and an oblique grid. In addition, optics assembly 206 may switch between different types of light patterns according to the manufacturing plan (e.g., when printing corners of structure 126 one grid may more suited than others). Alternatively, optics assembly 206 may switch between different types of light patterns when processing device 202 indicates that additional information is required to determine if second layer 308 is not aligned with first layer 306.

At step 406, camera 208 may capture image data of the previously deposited material. Camera 208 may be mounted to work tool 110 such that it can capture a top view of the light pattern. In some embodiments, control system 200 may further include or be operatively coupled with at least one additional camera. The cameras may capture image data of the previously deposited material from a plurality of different angles. Processing device 202 may combine the image data from all the cameras to obtain the visible formation of the light pattern. In one example, processing device 202 may perform an image stitching process to combine the image data captured by the cameras to obtain the visible formation about the light pattern. The process may take into account the relative positions of the cameras' viewpoints and map the displacement of pixels in the different images. Typically, a subgroup of pixels in one image will be overlaid with a subgroup of pixels in another image. In another example, processing device 202 may use a three-dimensional reconstruction process with the image data captured from the plurality of different angles to obtain the visible formation of the light pattern. The three-dimensional reconstruction process may represent the deposited material with the light pattern.

At step 408, processing device 202 may obtain, from the image data, a visible formation of the light pattern as it is projected on the previously deposited material. And at step 410, processing device 202 may compare the visible formation of the light pattern to a predicted formation of the light pattern. The formation of the light pattern includes a representation of the light pattern with or without the previously deposited material. FIGS. 3A and 3B illustrate an example of the visible formation, and FIGS. 3D and 3E illustrate an example of the predicted formation. As mentioned above, in some embodiments, optics assembly 206 may produce more than one type of light pattern. In these embodiments, processing device 202 may compare the visible formation of the more than one type of light pattern with more than one predicted formation of corresponding light patterns. For example, processing device 202 may make a comparison of a visible formation of a square grid with a predicted formation of a square grid; and make a comparison of a visible formation of an oblique grid with a predicted formation of an oblique grid. Also, as mentioned above, in other embodiments, work tool 110 may be associated with a plurality of cameras that capture image data from a plurality of different angles. In these embodiments, processing device 202 may compare the visible formation from more than one viewpoint to more than one predicted formation of corresponding viewpoints. For example, processing device 202 may make a comparison of a top-view visible formation with a top-view predicted formation; and make a comparison of a perspective-view visible formation with a perspective-view predicted formation.

At step 412 processing device 202 may determine if second layer 308 is aligned with first layer 306. In making this determination, processing device 202 may take into account the position of optics assembly 206 and the position of work tool 110 relative to structure 126, to calculate the geometry of the previously deposited material. Those of ordinary skill in the art of image processing will recognize that there are numerous methods for performing such calculations. Consistent with some embodiments, processing device 202 may determine that second layer 308 is not aligned with first layer 306 when a geometry of the visible formation differs from a geometry of the predicted formation by more than a predefined threshold. The predefined threshold may be associated with the deviation distance D1. The value of the predefined threshold may be set by the operator using user input 210, and may be job specific. For example, some structures may require a high level of accuracy and, thus, the predefined threshold may be set very low (e.g., D1<0.5 mm). Whereas, other structures may require a lesser level of accuracy and the predefined threshold may be set higher (e.g., D1<15 mm).

At step 414 processing device 202 may adjust the path being followed by work tool 110. The adjustment of the path affects how second layer 308 is being deposited on first layer 306. In some embodiments, the adjustment of the path being followed by work tool 110 may have two parts. The first part may include bringing second layer 308 back to a point that first layer 306 substantially overlaps with second layer 308 (i.e., from point 316 to point 318). The second part may include changing the trajectory of the depositing path of second layer 308 so the two layers will remain aligned (i.e., from point 318 onward). In addition, once the determination is made that second layer 308 is not aligned with first layer 306, processing device 202 may further identify at least two options to adjust the path for depositing second layer 308, and use a predefined rule to select one of the options. The options to adjust the path and the pre-defined rule may be associated with the adjustment period and/or other job-related parameters. Exemplary options may include selecting the fastest option to align the two layers or selecting the smoothest option to align the two layers.

The adjustment of the path being followed by work tool 110 while depositing second layer 308 atop first layer 306 may be recorded and employed in other embodiments, in one embodiment, when the additive-layers process includes forming a third layer of flowable material, processing device 202 may further determine a path for depositing the third layer atop second layer 308 based on the determination that second layer 308 is not aligned with first layer 306. For example, during an additive-layers process, work tool 110 may encounter strong side winds that may cause second layer 308 to deviate at angle α relative to first layer 306. If the strong side winds continue, then the second part of the adjustment of second layer 308 (i.e., the part that corrects the deviation angle α) may be similarly applied to the deposition of the third layer atop second layer 308.

As shown in FIG. 4, after adjusting the path being followed by work tool 110, steps 404-414 may continue in a loop until the construction of structure 126 is completed. Specifically, in one embodiment, optics assembly 206 may continue to produce a light pattern directed toward previously deposited material. Camera 208 may continue to capture image data of the previously deposited material. And processing device 202 may further obtain, from the image data, an additional visible formation of the light pattern after the adjustment of the path takes place; make an additional comparison of the additional visible formation of the light pattern to an additional predicted formation; make an additional determination that second layer 308 is still not aligned with first layer 306, based on the additional comparison; and make an additional adjustment of the path being followed by work tool 110 based on the additional determination.

It will be apparent to those skilled in the art that various modifications and variations can be made to the disclosed control system 200. Other embodiments will be apparent to those skilled in the art from consideration of the specification and practice of the disclosed parts of the system. It is intended that the specification and examples be considered as exemplary only, with a true scope being indicated by the following claims and their equivalents.

What is claimed is:

1. A control system comprising:
   an optics assembly configured to produce a light pattern directed toward previously deposited material,
      the previously deposited material including a first layer and a second layer;
   a camera configured to capture image data of the previously deposited material;
   a processing device in communication with the optics assembly and the camera,
      the processing device being configured to:
         obtain, based on the image data, a visible formation of the light pattern as it is projected onto the previously deposited material;
         make a comparison of the visible formation of the light pattern to a predicted formation;
         make a determination that the second layer is not aligned with the first layer based on the comparison;
         make an adjustment of a path being followed by a work tool based on the determination the second layer is not aligned with the first layer;
         obtain an additional visible formation of the light pattern after the adjustment of the path; and
         make an additional adjustment of the path being followed by the work tool based on the additional visible formation of the light pattern.

2. The control system of claim 1, wherein the adjustment of the path affects how the second layer is being deposited on the first layer.

3. The control system of claim 1, further comprising: the work tool,
   wherein the work tool is configured to form a three-dimensional structure in an additive-layers process,
   wherein the additive-layers process includes:
      forming the first layer by depositing flowable material from a print head,
      following the path for depositing the second layer of flowable material atop the first layer, and forming a third layer of flowable material atop the second layer, and
wherein the processing device is further configured to determine a path for depositing the third layer atop the second layer based on the determination that the second layer is not aligned with the first layer.

4. The control system of claim 1, wherein the optics assembly includes a plurality of light sources separated from each other that together produce the light pattern.

5. The control system of claim 1, wherein the optics assembly is mounted to the work tool and configured to produce a square grid, a rectangular grid, a centered rectangular grid, an oblique grid, or a hexagonal grid as the light pattern.

6. The control system of claim 1, wherein the optics assembly is configured to produce more than one type of light pattern and to switch between different types of light patterns.

7. The control system of claim 1, wherein the camera is mounted to the work tool and configured to capture a top view of the light pattern.

8. The control system of claim 1, further including:
at least one additional camera,
wherein, when obtaining the visible formation of the light pattern, the processing device is configured to:
combine the image data from the camera and additional image data from the at least one additional camera to obtain the visible formation of the light pattern.

9. The control system of claim 1, wherein the processing device is further configured to:
determine the predicted formation based on tool-related parameters and job-related parameters.

10. The control system of claim 1, wherein, when making the determination that the second layer is not aligned with the first layer, the processing device is configured to:
determine that the second layer is not aligned with the first layer based on a geometry of the visible formation being different from a geometry of the predicted formation by more than a threshold.

11. The control system of claim 1, wherein the processing device is further configured to:
identify, after the determination that the second layer is not aligned with the first layer, at least two options to adjust the path for depositing the second layer; and
use a pre-defined rule to select one of the at least two options for the adjustment of the path.

12. The control system of claim 1, further comprising:
the work tool,
wherein the work tool is connectable to a mobile machine having a linkage arrangement associated with a group of first actuators, and
wherein the adjustment of the path results from an operation of at least one actuator of the group of first actuators.

13. The control system of claim 12,
wherein the work tool is associated with a group of second actuators, and
wherein the adjustment of the path results from an operation of at least one actuator of the group of second actuators.

14. The control system of claim 1,
wherein the processing device is further configured to:
make an additional comparison of the additional visible formation of the light pattern to an additional predicted formation; and
make an additional determination that the second layer is still not aligned with the first layer based on the additional comparison, and
wherein, when making the additional adjustment of the path being followed by the work tool, the processing device is configured to:
make the additional adjustment of the path being followed by the work tool based on the additional determination that the second layer is still not aligned with the first layer.

15. A method comprising:
producing a light pattern directed toward previously deposited material,
the previously deposited material including a first layer and a second layer;
capturing image data of the previously deposited material;
obtaining, based on the image data, a visible formation of the light pattern as it is projected onto the previously deposited material;
making a comparison of the visible formation of the light pattern to a predicted formation of the light pattern;
making a determination that the second layer is not aligned with the first layer based on the comparison;
making an adjustment of a path being followed by a work tool based on the determination that the second layer is not aligned with the first layer;
obtaining an additional visible formation of the light pattern after the adjustment of the path; and
making an additional adjustment of the path being followed by the work tool based on the additional visible formation of the light pattern.

16. The method of claim 15, further including:
determining the predicted formation based on work tool-related parameters and job-related parameters.

17. The method of claim 15, further including:
identifying, after making the determination that the second layer is not aligned with the first layer, at least two options to adjust the path in which the second layer is being deposited on the first layer; and
using a pre-defined rule to select one of the at least two options for the adjustment of the path.

18. The method of claim 15,
wherein the work tool is operatively connected to a mobile machine having a linkage arrangement associated with a group of first actuators, and
wherein making the adjustment of the path includes adjusting operation of at least one of the group of first actuators.

19. The method of claim 18,
wherein the work tool is associated with a group of second actuators, and
wherein making the adjustment of the path further includes adjusting operation of at least one of the group of second actuators.

20. A non-transitory computer-readable medium storing instructions, the instructions comprising:
one or more instructions that, when executed by at least one processor, cause the at least one processor to:
determine, based on image data, a visible formation of light pattern as it is projected onto previously deposited material,
the previously deposited material including a first layer and a second layer;
make a comparison of the visible formation of the light pattern to a predicted formation of the light pattern;
determine that the second layer is not aligned with the first layer based on the comparison;

make an adjustment of a path being followed by a work tool based on determining that the second layer is not aligned with the first layer;
determine an additional visible formation of the light pattern after the adjustment of the path; and
make an additional adjustment of the path being followed by the work tool based on the additional visible formation of the light pattern.

\* \* \* \* \*